United States Patent [19]
Yashima et al.

[11] Patent Number: 5,428,599
[45] Date of Patent: Jun. 27, 1995

[54] OPTICAL RECORDING MEDIUM, INFORMATION RECORDING METHOD AND INFORMATION REPRODUCING METHOD

[75] Inventors: Masataka Yashima, Yokohama; Hiroyuki Sugata, Yamato; Tsuyoshi Santo, Yokohama; Miki Tamura; Chieko Mihara, both of Isehara, all of Japan

[73] Assignee: Canon Kabushiki Kaisha, Tokyo, Japan

[21] Appl. No.: 77,537

[22] Filed: Jun. 17, 1993

[30] Foreign Application Priority Data

Jun. 18, 1992 [JP] Japan ................... 4-159602

[51] Int. Cl.⁶ .................. G11B 7/00; G03C 1/72
[52] U.S. Cl. ................... 369/283; 369/284; 369/275.1; 369/286; 430/270; 430/495; 430/945
[58] Field of Search .............. 369/275.1, 283, 284, 369/109, 275.3, 286; 360/59, 55; 430/495, 270, 945

[56] References Cited

U.S. PATENT DOCUMENTS

| | | | |
|---|---|---|---|
| 4,189,735 | 2/1980 | Bell et al. ............ | 430/964 |
| 4,380,769 | 4/1983 | Thomas et al. ........ | 346/135.1 |
| 4,638,335 | 1/1987 | Smith et al. .......... | 369/284 |
| 4,719,615 | 1/1988 | Feyrer et al. ......... | 369/284 |
| 4,871,601 | 10/1989 | Miura et al. .......... | 369/283 |
| 4,921,780 | 5/1990 | Oguchi et al. ........ | 430/495 |
| 4,923,390 | 5/1990 | Oguchi et al. ........ | 430/495 |
| 4,965,178 | 10/1990 | Santoh et al. ........ | 430/495 |
| 5,009,987 | 4/1991 | Mihara et al. ........ | 430/495 |
| 5,024,917 | 6/1991 | Mihara et al. ........ | 430/495 |
| 5,108,873 | 4/1992 | Fukui et al. .......... | 430/495 |
| 5,121,376 | 6/1992 | Kuder et al. ......... | 369/100 |
| 5,190,849 | 3/1993 | Santoh et al. ........ | 430/495 |
| 5,208,088 | 5/1993 | Tominaga et al. ..... | 369/283 |
| 5,236,755 | 8/1993 | Howe et al. .......... | 369/283 |
| 5,270,150 | 12/1993 | Oishi et al. .......... | 369/283 |

FOREIGN PATENT DOCUMENTS

| | | |
|---|---|---|
| 0092707 | 11/1983 | European Pat. Off. . |
| 0410879 | 1/1991 | European Pat. Off. . |
| 0514211 | 11/1992 | European Pat. Off. . |
| 2148148 | 5/1985 | United Kingdom . |
| WO8911147 | 11/1989 | WIPO . |

*Primary Examiner*—Georgia Y. Epps
*Assistant Examiner*—Kim-Kwok Chu
*Attorney, Agent, or Firm*—Fitzpatrick, Cella, Harper & Scinto

[57] ABSTRACT

An optical recording medium includes in sequence a transparent substrate, a light-reflecting layer, a transparent intermediate layer and a light-absorbing layer. The light-reflecting layer and the light-absorbing layer are respectively formed as a layer of an organic coloring matter. The light-absorbing layer can cause deformation for recording information accompanied with a local charge in thickness of the transparent intermediate layer in response to a recording beam indicated to the light-absorbing layer through the transparent substrate. The transparent substrate, the light-reflecting layer, the transparent intermediate layer and the light-absorbing layer in combination constitutes a multi-layer optical element with respect to a reproducing beam having a prescribed wavelength and incident to the light-absorbing layer through the transparent substrate, the multi-layer optical element showing a minimum reflectance and a maximum reflectance of the reproducing beam at an incident surface of the optical recording medium at different thicknesses of the transparent intermediate layer. The transparent intermediate layer is formed in a thickness providing a mediate reflectance between the maximum and minimum transmittances. At the record pit, the multi-layer optical element is converted into a fresh element providing a successive reflectance change including a higher and a lower reflectance with respect to the reference reflectance at non-record parts, due to the change in thickness of the transparent intermediate layer.

22 Claims, 8 Drawing Sheets

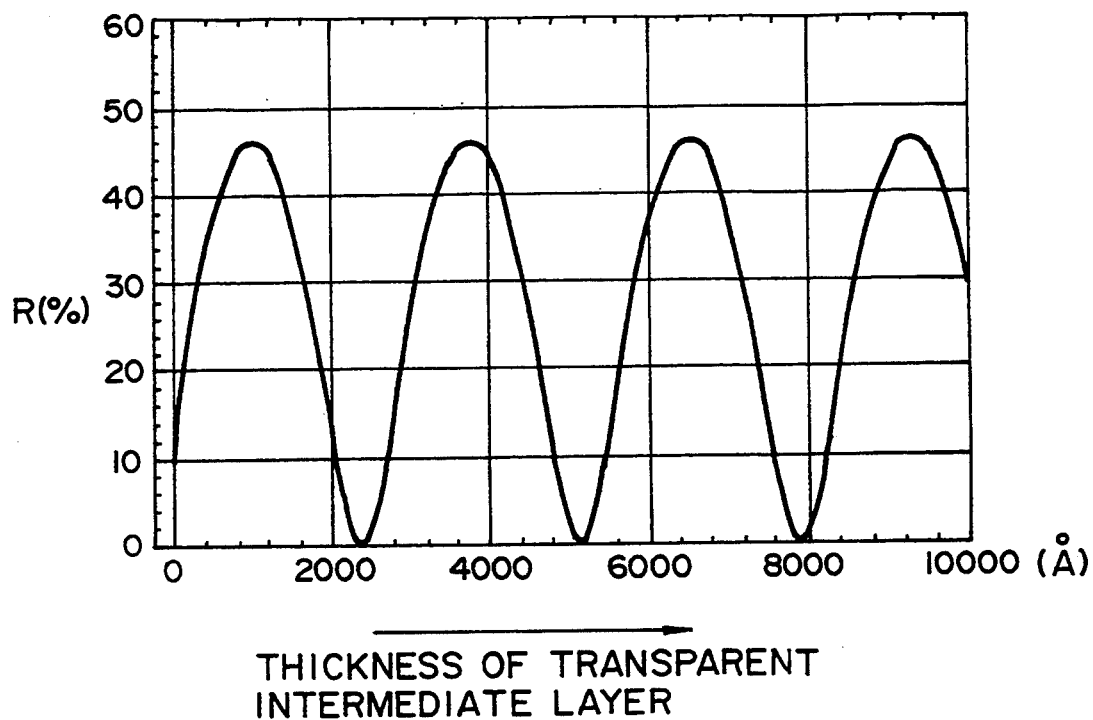
THICKNESS OF TRANSPARENT INTERMEDIATE LAYER
F I G. 9
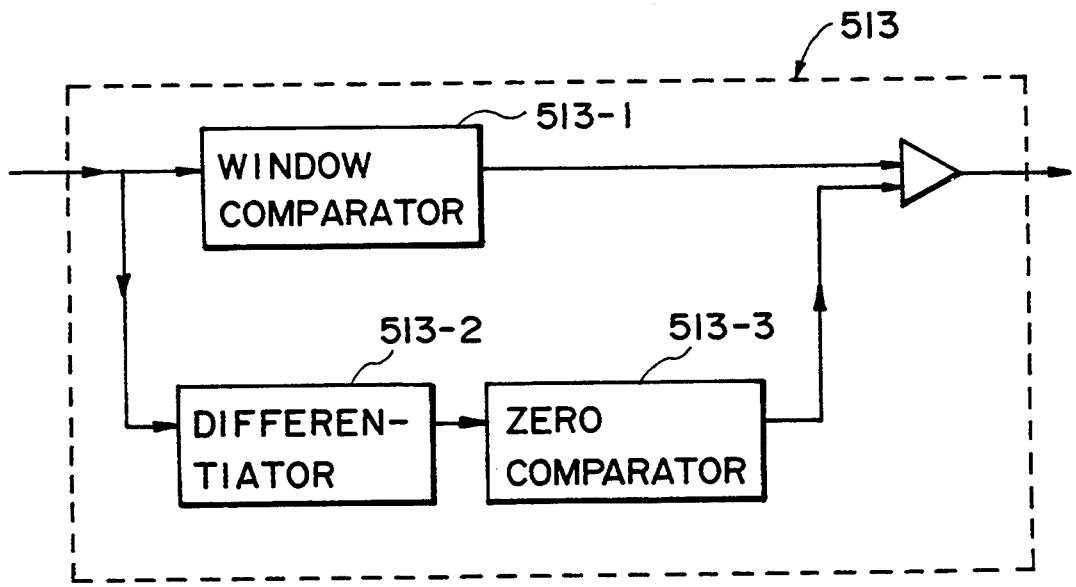
F I G. 10

OPTICAL RECORDING MEDIUM, INFORMATION RECORDING METHOD AND INFORMATION REPRODUCING METHOD

FIELD OF THE INVENTION AND RELATED ART

The present invention relates to an optical recording medium (inclusive of a record blank and the resultant record) for optical information recording and reproduction, and methods for optical information recording and reproduction using the optical recording medium.

Optical recording media have called attention as media for information recording and reproduction in recent years because of, e.g., capability of non-contact recording and reproduction and quick accessibility.

Optical recording media proposed heretofore may for example include the following types:

(a) One including a recording layer comprising a metal film; and (b) One including a recording layer comprising a layer of an organic coloring matter.

More specifically, an optical recording medium of the above type (a) includes a recording layer of a film comprising principally a low-melting point metal, such as Te, in which recording layer a pit is formed by producing a hole by light illumination or by causing a change in reflectance through a crystal-amorphous phase transition.

In the optical recording medium of the type (b), an organic light-absorption layer is irradiated with laser light to form pits therein due to decoloration and/or deformation, thus effecting recording.

In the optical recording media of the above types (a) and (b), information reproduction is effected by scanning record parts (pits) formed on a track with reproducing light and detecting the pits due to a decrease in reflected light quantity from the optical recording medium at the pits. The decrease in reflected light quantity is however also caused by a scar formed on a dust attached to the surface of the optical recording medium, so that such scar or dust can provide a serious obstacle to accurate information reproduction.

On the other hand, a type of optical recording medium providing information record pits with an increased reflectance has been disclosed by, e.g., U.S. Pat. No. 4,189,735, which discloses an optical recording medium wherein a substrate is coated with a reflection layer and a light-absorbing layer in lamination, and the light-absorbing layer is set to a thickness providing a minimum surface reflectance therefrom, so that the light-absorbing layer is removed by a recording beam to expose the reflection layer, thus effecting recording. The optical recording medium of this structure, however, requires a large quantity of recording energy because heat is diffused to the reflection layer adjacent to the light-absorbing layer and is thus not suitable for use in a current system using a weak-intensity semiconductor laser as a recording light source.

Another structure of optical recording medium providing an increased reflectance at record pits is also known, wherein a phase transition material is used to constitute a recording layer of which a part irradiated with a laser beam causes phase transition to form a record pit having an increased reflectance. This type of recording medium requires strict control of heat generated by the recording beam and is thus accompanied with a difficulty in uniform recording.

SUMMARY OF THE INVENTION

In view of the above-mentioned problems, an object of the present invention is to provide an optical recording medium which allows easy and uniform recording at a high recording sensitivity and also accurate reproduction even when it is scarred or dust is attached thereto.

Another object of the present invention is to provide an information recording method and an information reproducing method using such an optical recording method capable of reading and reproducing recorded information from the recording medium even when scar or dust is left on the surface of the recording medium.

As a result of our study for accomplishing the above objects, it has been discovered that, when an optical recording medium as shown in FIG. 2 sequentially having a light-reflecting layer 102, a transparent intermediate layer 103 and a light-absorbing layer 104 in lamination on a transparent substrate 101 is irradiated with a prescribed intensity of recording beam, a pit 202 characterized by a wevelike deformation of the light-absorbing layer 104 and the transparent intermediate layer 103 as shown in FIG. 2 so that, within the pit, the transparent intermediate layer 103 is caused to have a smaller thickness and a larger thickness than a prescribed thickness of the transparent intermediate layer outside the pit, i.e., at non-record parts or non-pit parts.

According to the present invention accomplished based on the above discovery, there is provided an opticell recording medium (record blank), comprising in sequence a transparent substrate, a light-reflecting layer, a transparent intermediate layer and a light-absorbing layer, the light-reflecting layer and the light-absorbing layer comprising an organic coloring matter;

the light-absorbing layer being capable of deformation for recording information accompanied with. a local charge in thickness of the transparent intermediate layer in response to a recording beam indicated to the light-absorbing layer through the transparent substrate, the transparent substrate, the light-reflecting layer, the transparent intermediate layer and the light-absorbing layer in combination constituting a multi-layer optical element with respect to a reproducing beam having a prescribed wavelength and incident to the light-absorbing layer through the transparent substrate, the multi-layer optical element showing a minimum reflectance and a maximum reflectance of the reproducing beam at an incident surface of the optical recording medium at different thicknesses of the transparent intermediate layer, the transparent intermediate layer being formed in a thickness providing a mediate reflectance between the maximum and minimum transmittances.

According to another aspect of the present invention, there is provided an optical recording medium (information record), comprising in sequence a transparent substrate, a light-reflecting layer, a transparent intermediate layer and a light-absorbing layer, the light-reflecting layer and the light-absorbing layer comprising an organic coloring matter;

the light-absorbing layer being provided with a record pit accompanied with a geometrical deformation for recording information formed by a recording beam incident to the light-absorbing layer through the transparent substrate, the transparent substrate, the light-reflecting layer, the transparent intermediate layer and the light-absorbing layer in combination constituting a multi-layer optical element with respect to a reproducing beam having a prescribed wavelength and incident to the light-absorbing layer through the transparent substrate, the multi-layer optical element, owing to the geometrical deformation of the light-absorbing layer, providing a successive change of first a higher and then a lower reflectance or a successive change of first a lower and then a higher reflectance of a reproducing beam incident to the light-absorbing layer through the transparent substrate, respectively than a reference reflectance of the reproducing beam at non-recorded parts, when a track including the pit is scanned with the reproducing beam.

According to still another aspect of the present invention, there is provided an information recording method, comprising:

providing an optical recording medium comprising in sequence a transparent substrate, a light-reflecting layer, a transparent intermediate layer and a light-absorbing layer, the transparent substrate, the light-reflecting layer, the transparent intermediate layer and the light-absorbing layer in combination forming a laminate constituting a multi-layer optical element with respect to a reproducing beam having a prescribed wavelength and incident to the light-absorbing layer through the transparent substrate, the multi-layer optical element showing a minimum reflectance and a maximum reflectance of the reproducing beam ,at an incident surface of the optical recording medium at different thicknesses of the transparent intermediate layer, the transparent intermediate layer being formed in a thickness providing a mediate reflectance between the maximum and minimum transmittances; and irradiating the light-absorbing layer through the transparent substrate with a recording beam while moving the optical recording medium relative to the recording beam to form a record pit accompanying a geometrical deformation of the light-absorbing layer for recording information, thereby causing the laminate to form at the record pit a new multi-layer optical element which provides a successive change of first a higher and then a lower reflectance or a successive change of first a lower and then a higher reflectance of a reproducing beam incident to the light-absorbing layer through the transparent substrate, respectively than a reference reflectance of the reproducing beam at non-recorded parts, when a track including the record pit is scanned with the reproducing beam.

According to a further aspect of the present invention, there is provided an information reproducing method comprising:

providing an optical recording medium, comprising in sequence a transparent substrate, a light-reflecting layer, a transparent intermediate layer and a light-absorbing layer, the light-reflecting layer and the light-absorbing layer comprising an organic coloring matter; the light-absorbing layer being provided with a record pit accompanied with a geometrical deformation for recording information formed by a recording beam incident to the light-absorbing layer through the transparent substrate, and scanning a track including the record pit with a reproducing beam incident to the light-absorbing layer through the transparent substrate to provide a successive reflectance change of first a higher and then a lower reflectance or a successive change of first a lower and then a higher reflectance of the reproducing beam, respectively than a reference reflectance of the reproducing beam at non-recorded parts, thereby detecting the successive reflectance change as an indication of a record pit.

According to a still further aspect of the present invention, there is provided an information reproducing method comprising:

providing an optical recording medium, comprising in sequence a transparent substrate, a light-reflecting layer, a transparent intermediate layer having a prescribed thickness and a light-absorbing layer, the light-reflecting layer and the light-absorbing layer comprising an organic coloring matter; the light-absorbing layer being provided with a record pit accompanied with a geometrical deformation for recording information formed by a recording beam incident to the light-absorbing layer through the transparent substrate, whereby the transparent intermediate layer is provided with a thickness change including first a decrease and then an increase relative to the prescribed thickness in a direction of scanning with the recording beam; and scanning a track including the record pit with a reproducing beam incident to the light-absorbing layer through the transparent substrate, the reproducing beam having a wavelength set to provide a multiple optical element comprising the transparent substrate, the light-reflecting layer, the transparent intermediate layer and the light-absorbing layer at the record pit and providing a reproduced signal which comprises a successive change of first a higher and then a lower reflectance or a successive change of first a lower and then a higher reflectance of the reproducing beam, respectively than a reference reflectance of the reproducing beam at non-recorded parts.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 9 is a graph showing a relationship between the reflectance R (%) and the thickness of transparent intermediate layer of the optical card of Example 1.

FIG. 10 is a block diagram for illustrating a comparator shown in FIG. 5.

DETAILED DESCRIPTION OF THE INVENTION

Figure 1:
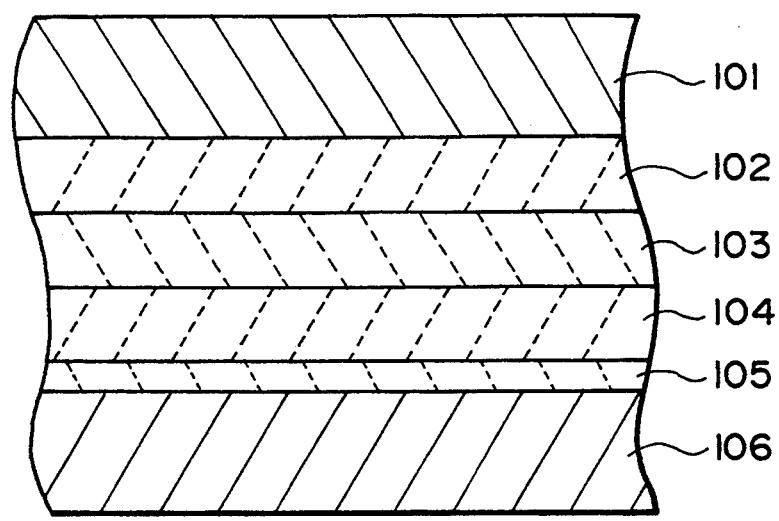
FIG. 1 is a schematic sectional view of an embodiment of the optical recording medium (record blank) according to the present invention.

FIG. 1 is a schematic sectional view of an optical recording medium (record blank) before information recording according to the present invention. Referring to FIG. 1, the optical recording medium includes a transparent substrate 101, a light-reflecting layer 102, a transparent intermediate layer 103, a light-absorbing layer 104, an adhesive layer 105 and a protective substrate 106. The light-reflecting layer 102 and light-absorbing layer 104 may respectively be composed as an organic coloring matter layer, i.e., a layer comprising an organic coloring matter.

Figure 2:
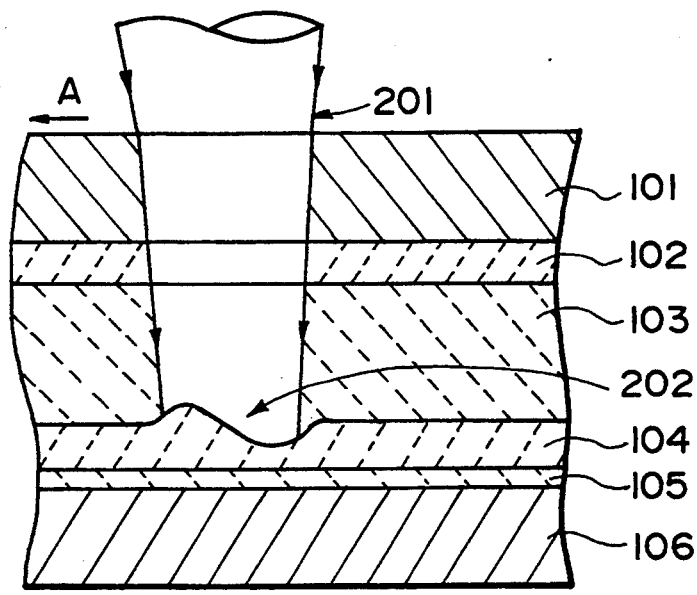
FIG. 2 is a schematic sectional view of an optical recording medium (information record) obtained by recording information in the record blank shown in FIG. 1.

FIG. 2 is a schematic sectional view showing a manner of pit formation, wherein the record blank shown in FIG. 1 is moved in the direction of an arrow A and simultaneously a recording beam 201 having a prescribed intensity is incident through the transparent substrate 101 to the light-absorbing layer 104, thereby forming a record pit 202 accompanied with a geometrical deformation. The sectional view of FIG. 2 is taken along the scanning direction A.

In the present invention, it is preferred that the optical constants of the above-mentioned light-reflecting layer 102, transparent intermediate layer 103 and light-absorbing layer 104 and the thicknesses of these layers other than the transparent. intermediate layer 103 are set so as to constitute a multi-layer optical element with respect to a reproducing light beam having a wavelength λr incident to the light-absorbing layer 104 through the transparent substrate 101, which multi-layer optical element shows a minimum reflectance and a maximum reflectance of the reproducing beam at the incident surface of the optical recording medium at different thicknesses of the transparent intermediate layer due to optical interference effects of the respective layers, e.g., as shown in FIG. 9, and the thickness of the transparent intermediate layer 103 is so set as to provide a mediate reflectance between the maximum and minimum reflectances. Herein, a mediate reflectance between the minimum and maximum reflectances may preferably mean a reflectance falling within a range covering central five tenths (5/10), more preferably central three tenths (3/10) of the range between the minimum and maximum reflectances. For example, in case where the minimum reflectance is 0% and the maximum reflectance is 60%, the medium reflectance may preferably fall within a range of 15–45% (30% ±60% ×0.5/2), more preferably within a range of 21–39% (30% ±60×0.3/2).

When an optical recording medium constituted in the above-described manner is irradiated with a recording beam having a prescribed intensity, a record pit 202 accompanied with a geometrical shape change is formed in the light-absorbing layer as shown in FIG. 2, and the transparent intermediate layer 104 is provided with varying thicknesses, i.e., a smaller thickness and then a larger thickness in the scanning direction of the recording beam, within the part of the record pit 202, respectively, compared with the prescribed thickness of the transparent intermediate layer outside the record pit 202, i.e., at non-record parts.

Figure 3A:
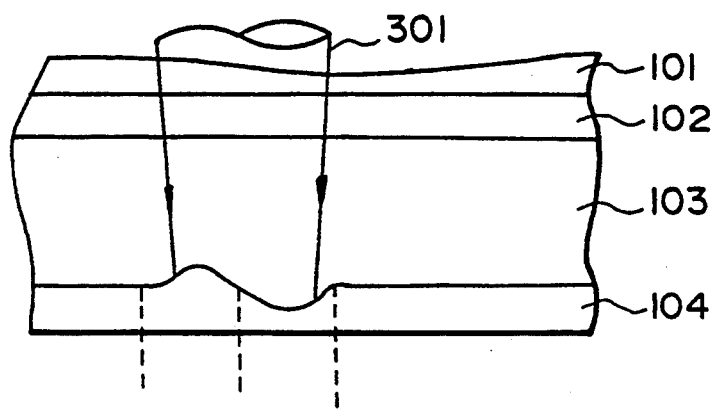
FIG. 3(a) is an enlarged sectional view in the neighborhood of a pit of an embodiment of the information record according to the present invention.
Figure 3B:
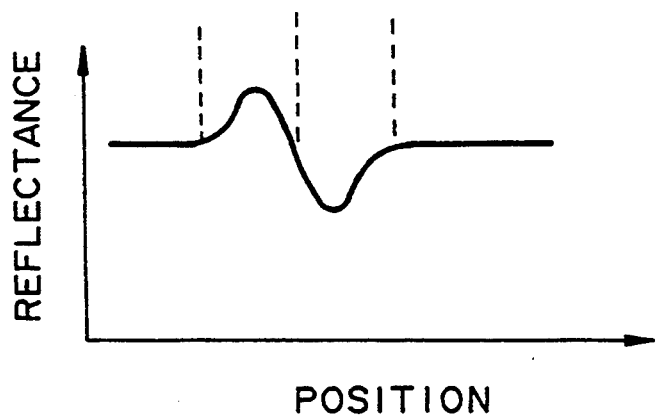
FIG. 3(b) is a waveform diagram showing a reproduced signal (transmittance change) obtained by scanning the pit of the information record shown in FIG. 3(a) with a reproducing beam.
Figure 4A:
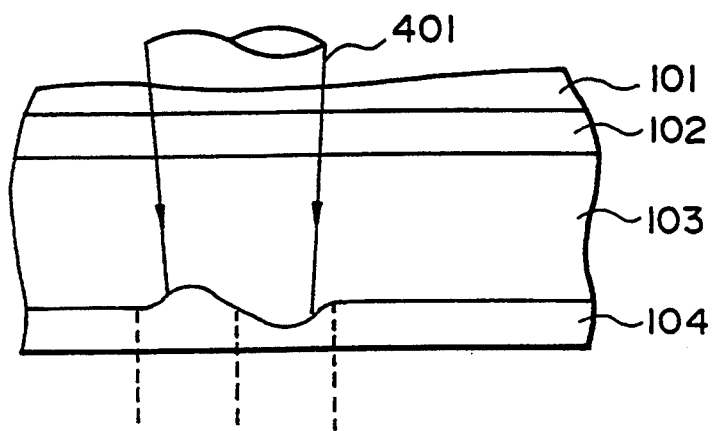
FIG. 4(a) is an enlarged sectional view in the neighborhood of a pit of another embodiment of the information record according to the present invention.
Figure 4B:
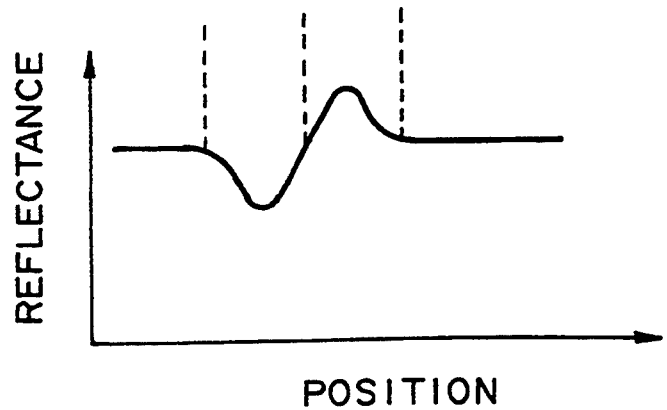
FIG. 4(b) is a waveform diagram showing a reproduced signal obtained by scanning the pit of the information record shown in FIG. 4(a) with a reproducing beam.

Such a thickness change of the transparent intermediate layer in the optical recording medium of the present invention changes the interference effect with respect to the reproducing beam of a laminate including the transparent substrate, light-reflecting layer, transparent intermediate layer and light-absorbing layer to provide a new multi-layer optical element. More specifically, with reference to FIGS. 3 and 4, when a track including such a pit is scanned with a reproducing beam 301 or 401 having a wavelength λr, the reflectance of the reproducing beam (i.e., reproduced signal) at the pit is such that it causes a successive change of first a higher and then a lower reflectance (as shown in FIG. 3(b)) or a successive change of first a lower and then a higher reflectance (as shown in FIG. 4(b)), respectively compared with a reference reflectance of the reproducing beam at the non-record parts, according to the new multi-layer optical element.

As such a record pit showing a successive change of reflectance of the reproducing beam is formed in a recording track and used for reproduction, it is possible to suppress the occurrence of error in information reproduction due to scar or dust attached to the optical recording medium than in the conventional reproducing system wherein a pit position is detected simply as a reduction in reflectance.

A preferred condition regarding the thickness of the transparent intermediate layer 3 has been generally described above, but the thickness may preferably be set so as to satisfy the above condition within the range of at least 1000 Å, more preferably at least 1500 Å, further preferably at least 3000 Å and at most 2 μm. More specifically, if the thickness of the transparent intermediate layer 3 is made 1000 Å or larger, it is possible to prevent the breakage of the multi-layer optical element composed by the transparent substrate, light-reflecting layer, transparent intermediate layer and light-absorbing layer providing a successive change in reflectance due to the diffusion of heat generated in the light-absorbing layer by irradiations with the recording beam into the light-reflecting layer thus causing deformation or decoloration of the light-reflecting layer.

The light-reflecting layer in the optical recording medium according to the present invention may preferably have a thickness $d^{ref}$ which is set to provide a pit showing a larger increase in reflectance of the reproducing beam compared with the reference value thereof so as to prevent a reproduction error due to attachment of dust or scar. As described above, the attachment of dust or scar lowers the reflectance of the reproducing beam by the optical recording medium, so that the increase in reflectance of the reproducing beam at a pit provides an important factor in the information reproducing method of the present invention for differentiating a change in reflectance of the reproducing beam due to the dust or scar and a change in reflectance of the reproducing beam due to a pit. Accordingly, when the complex refractive index of the light-reflecting layer is expressed by $N^{ref}=n^{ref}-ik^{ref}$, the thickness $d^{ref}$ may preferably be set to satisfy a relationship represented by the following formula (1):

$$(\lambda r/6n^{ref})(2l+1) < d^{ref} < (\lambda r/3n^{ref})(2l+1) \quad (1),$$

wherein l is 0 or a positive integer. It is particularly, preferred that the following formula (2) is satisfied:

$$d^{ref}=(\lambda n/4n^{ref})(2l+1)\pm\lambda r/32n^{ref} \quad (2).$$

On the other, the thickness $d^{abs}$ of the light-absorbing layer may preferably satisfy $$d^{abs}=(\lambda r/4n^{abs})(2p+1)\pm\lambda r/32n^{abs},$$

wherein the complex refractive index is denoted by $N^{abs}=n^{abs}-ik^{abs}$ and p denotes 0 or a positive integer, so as to increase the reflectance of the reproducing beam. In view of the absorption quantity of the recording beam, $d^{abs}$ may preferably satisfy a relationship of:

$$(\ln 2\cdot\lambda w/2\pi\cdot k^{abs}) \leq d^{abs} \leq \lambda w/3n^{abs}),$$

wherein $\lambda w$ denotes the wavelength of the recording beam.

In the present invention, the wavelength $\lambda r$ of the reproducing beam may preferably be set to be substantially identical to the reflection maximum wavelength $\lambda(R^{ref}\text{max})$ of the light-reflecting layer and to satisfy a relationship of the following formula (4) with the absorption maximum wavelength $\lambda^{ref}\text{max}$ of the light-reflecting layer so as to further increase the reflectance of the reproducing beam at the light-incidence surface of the optical recording medium according to the present invention:

$$\lambda r - \lambda^{ref}\text{max} > 100 \text{ nm} \quad (4)$$

In the optical recording medium according to the present invention, the light-reflecting layer 102 and the light-absorbing layer 104 may preferably be formed to provide mutually different maximum absorption wavelengths. It is particularly preferred that the organic coloring matters constituting the light-reflecting layer 102 and the light-absorbing layer 104 and/or the wavelength $\lambda w$ of the recording beam are set to be substantially identical to the maximum absorption wavelength $\lambda^{abs}\text{max}$ and to satisfy a relationship of the following formula (3) with the maximum absorption wavelength $\lambda^{ref}\text{max}$ of the light-reflecting layer:

$$\lambda w > \lambda^{ref}\text{max} \quad (3).$$

More specifically, by satisfying the above relationships, the maximum absorption wavelength of the light-reflecting layer is shorter than the wavelength of the recording beam, so that the absorption of the recording beam by the light-reflecting layer becomes small, and the reflection of the recording beam becomes high because the maximum reflection wavelength is generally longer than the maximum absorption wavelength. On the other hand, by having the absorption peak wavelength of the light-absorbing layer 104 substantially coincide with the wavelength of the recording beam, the absorption efficiency of the recording beam is increased. As a result, it is possible to obtain an organic optical recording medium showing a high reflectance while suppressing a lowering in recording sensitivity accompanying an increased reflectance at the surface to retain a good recording sensitivity.

In the present invention, it is preferred that the materials of the optical recording medium and/or the wavelength of the recording beam are selected so that a light beam having a wavelength identical to the wavelength $\lambda w$ of the recording beam shows an absorption of at most 20%, particularly at most 10%, at the light-reflecting layer, an absorption of at most 5%, particularly at most 1%, at the transparent intermediate layer, and an absorption of at least 50%, particularly at least 60%, at the light-absorbing layer. By such setting, the recording beam is not remarkably attenuated due to absorption by the light-reflecting layer to effectively reach the light-absorbing layer, thus allowing recording at good sensitivity by formation of pits in the light-absorbing layer and light-reflecting layer.

Further, by selecting the materials of the light-reflecting layer and transparent intermediate layer and/or the wavelength of the reproducing beam, it is possible to provide a further higher reflectance at the light-incidence surface of the optical recording medium due to interference by the multi-layer optical element.

Hereinbelow, the materials and function of the respective layers constituting the optical recording medium according to the present invention will be more specifically described.

Transparent Substrate (101)

The transparent substrate 101 may suitably be transparent to laser light so as to allow recording and reproduction through the substrate. Accordingly, the substrate may comprise, e.g., plastics, such as polyester resin, acrylic resin, polyamide resin, polycarbonate resin, polyolefin resin, phenolic resin, epoxy resin and polyimide resin, and glass.

The surface of the substrate may be provided with a preformat, such as guide grooves, guide pits or address signals for tracking, which may be formed directly in the plastics or glass constituting the substrate or in a coating layer of, e.g., a photopolymer resin.

Light-reflecting layer (102) and Light-absorbing Layer (104)

In the present invention, the light-reflecting layer and light-absorbing layer may respectively be constituted as a layer comprising an organic coloring matter, suitable examples of which may include dyes of polymethine-type, azulene-type, pyrylium-type, squalium-type, croconium-type, triphenylmethane-type, xanthene-type, anthraquinone-type, cyanine-type, phthalocyanine-type, dioxazine-type, tetrahydrocholine-type, triphenothiazine-type, phenanthrene-type, aminium salt-diimmonium slat-type, and metal complex-type. Pigments of similar structures can also be used.

One or more of the above coloring matters may be selected appropriately in view of the optical constants, the maximum absorption wavelength, the maximum reflection wavelength. As described above, the light-absorbing layer may preferably be composed by a material providing a maximum absorption wavelength $\lambda^{abs}\text{max}$ which is substantially equal to $\lambda w$ the wavelength of the recording light beam, and the light-reflecting layer may preferably be composed by a material providing a maximum reflection wavelength $\lambda(R^{ref}\text{max})$ which is substantially equal to $\lambda r$, the wavelength of the reproducing light beam.

In the present invention, the above-mentioned substantial equality between $\lambda w$ and $\lambda^{abs}{max}$ is satisfied when the following formula (5) is satisfied:

$$\{\lambda^{abs}{max} - \lambda w\} < 50 \text{ nm} \qquad (5)$$

Further, the above-mentioned substantial equality between $\lambda r$ and $\lambda(R^{ref}{max})$ is satisfied when $\lambda r$ is within a wavelength region in which a single layer of the light-reflecting layer shows 0.7 to 1.1 times the maXimum absorptance which the Single layer of the light-reflecting layer shows with respect to light having the wavelength of $\lambda(R^{ref}{max})$.

Further, as described above, the light-absorbing layer may preferably show an absorptance of at least 50%, particularly at least 60%, with respect to the recording light beam, and the light-reflecting layer may preferably show an absorptance of at most 20%, particularly at most 10%, with respect to both the recording light beam and the reproducing light beam, whereby recording can be performed at a high sensitivity to provide a record and the record can be reproduced at a high contrast.

An optical stabilizer, such as an aminimum salt or diimonium salt, can be used together with the above-mentioned organic coloring matter. The light-reflecting layer and the light-absorbing layer may suitably be formed as binder-free layers, but an appropriate binder can be included in the light-reflecting layer and/or the light-absorbing layer in order to improve the film-forming characteristic.

Transparent Intermediate Layer (103)

The transparent intermediate layer 103 may be composed by a material which shows substantial transparency, more specifically an absorptance of at most 5%, particularly at most 1%, with respect to both laser light beams having wavelengths $\lambda w$ and $\lambda r$ and may be formed in a thickness satisfying the above-mentioned requirement, i.e., providing media transmittance between the maximum and minimum transmittances. Examples of the material may include: organic resins, such as polyvinyl alcohol and polyvinyl acetal resin, polyurethane resin, polyamide resin, polystyrene resin, cellulose derivatives, ethylene-vinyl acetate copolymer, ethylene-acrylic acid copolymer, polyolefin resin and copolymers thereof, polycarbonate resin, acrylic resin, silicone resin, polyester resin, polyparaxylylene, and petroleum resin. The transparent intermediate layer may be formed as a film of such a resin, formed, e.g., by various coating methods, vapor deposition, plasma polymerization, or CVD process.

The optical recording medium according to the present invention may be prepared, e.g., by coating a transparent substrate 101 in sequence with an organic coloring matter layer (light-reflecting layer 102), a transparent intermediate layer 103 and an organic coloring matter layer (light-absorbing layer 104) respectively in prescribed thicknesses by various coating methods, vapor deposition, plasma polymerization, CVD process, etc., and the light-absorbing layer 104 may be further covered with a protective layer 106 by the medium of an adhesive layer 105.

In case where the transparent intermediate layer 103 is composed by a material showing an adhesiveness, the optical recording medium may be constituted by forming a light-reflecting layer 102 on a transparent substrate 101, forming a light-absorbing layer 104 on a protective substrate 106, and bonding the light-reflecting layer 102 and the light-absorbing layer 104 with the transparent intermediate layer 103.

Next, information recording and reproducing methods using the optical recording medium according to the present invention will now be described.

The information reproducing method of the present invention is characterized by:

providing an optical recording medium of the present invention comprising in sequence a transparent substrate, a light-reflecting layer, a transparent intermediate layer and a light-absorbing layer, the transparent substrate, the light-reflecting layer, the transparent intermediate layer and the light-absorbing layer in combination forming a laminate constituting a multi-layer optical element with respect to a reproducing beam having a prescribed wavelength and incident to the light-absorbing layer through the transparent substrate, the multi-layer optical element showing a minimum reflectance and a maximum reflectance of the reproducing beam at an incident surface of the optical recording medium at different thicknesses of the transparent intermediate layer, the transparent intermediate layer being formed in a thickness providing a mediate reflectance between the maximum and minimum transmittances; and irradiating the light-absorbing layer through the transparent substrate with a recording beam while moving the optical recording medium relative to the recording beam to form a record pit accompanying a geometrical deformation of the light-absorbing layer for recording information, thereby causing the laminate to form at the record pit a new multi-layer optical element which provides a successive change of first a higher and then a lower reflectance or a successive change of first a lower and then a higher reflectance of a reproducing beam incident to the light-absorbing layer through the transparent substrate, respectively than a reference reflectance of the reproducing beam at non-recorded parts, when a track including the record pit is scanned with the reproducing beam.

In the optical recording method according to the present invention, the recording light beam incident to the transparent substrate 101 is first reflected at the surface of the light-reflecting layer. However, unlike in the case of using a metal reflecting layer, some tenths of the incident light beam are allowed to pass through the light-reflecting layer 102 and the transparent intermediate layer 103 to be focused at the light-absorbing layer 104 since the light-reflecting layer 102 in the present invention comprises an organic coloring matter. The focused light beam is absorbed and converted into heat at the light-absorbing layer, thereby to form a record pit accompanied with a geometrical shape change. At this time, if a light beam having a prescribed intensity is used as the recording beam, the formation of a record pit in the light-absorbing layer may be accompanied with a successive change of first a smaller thickness and then a larger thickness of the transparent intermediate layer in the scanning direction of the recording beam, respectively compared with a prescribed thickness at non-recorded parts of the transparent intermediate layer. As a result of the successive change in thickness of the transparent intermediate layer, it is possible to form a new multi-layer optical element including the transparent substrate, light-reflecting layer, transparent intermediate layer and light-absorbing layer providing a successive change in reflectance of a reproducing beam having a wavelength λr of first a lower and then a higher reflectance at the record pit than a reference reflectance at non-recorded parts when a track including the record pit is scanned with the reproducing beam.

The recording beam intensity used in the information recording method according to the present invention can vary in various manners depending on the specific structure and material of the optical recording medium according to the present invention, but the upper limit thereof may preferably be set so as not to cause a change, such as deformation or decoloration, of the light-reflecting layer for the purpose of forming a multi-layer optical element showing a successive change in reflectance of the reproducing beam as described above at the record pit.

Information reproduction from the optical recording medium carrying recorded information according to the present invention is performed by continuously moving the optical recording medium relative to a reproducing beam and causing the reproducing beam to be incident through the transparent substrate to detect a reflected portion of the reproducing beam from the optical recording medium, thereby reproducing the information. In this instance, if the reproducing beam is set to have a wavelength λr providing reflectance at non-recorded parts which is mediate between the minimum and maximum reflectances caused by changes in thickness of the transparent intermediate layer, the record pit is caused to provide a successive change as described above of the reproducing beam.

By detecting such a successive change in reflectance at the pit as the presence of a pit by the reproducing apparatus, it is possible to always effect accurate information reproduction even if dust or scar causing a lowering in reflectance of the reproducing beam is attached to the optical recording medium.

Further, in case where the wavelength λr of the reproducing beam is selected to be substantially equal to the maximum reflection wavelength $\lambda(R^{ref}max)$ of the light-reflecting layer, the reflectance by the optical recording medium according to the present invention can be further increased. As a result, in the information reproducing method according to the present invention,, it is possible to further enhance an increase in reflectance at the pit from the reference reflectance at non-recorded parts, thus providing an enhanced accuracy of pit detection.

Further, if the recording beam wavelength λw is made substantially equal to the maximum absorption wavelength $\lambda^{abs}max$ of the light-absorbing layer, it is possible to realize a high-sensitivity information recording method. Further, in case where the recording beam wavelength λw and the reproducing beam wavelength λr are equal to each other in the present invention, it is particularly preferred to set λw and $\lambda^{abs}max$ to be substantially equal to each other as described above. This is because the optical recording medium according to the present invention is constituted to show a high reflectance at the wavelength of the reproducing light beam as described above, and the sensitivity to the recording light beam of the optical recording medium is also substantially lowered in the case where the wavelengths of the recording light beam and the reproducing light beam are equal to each other. By setting λw and $\lambda^{abs}max$ equal to each other, however, it is possible to control the sensitivity of the optical recording medium to the recording light beam to such a level that a light beam having an excessive power is not required for recording.

Figure 5:
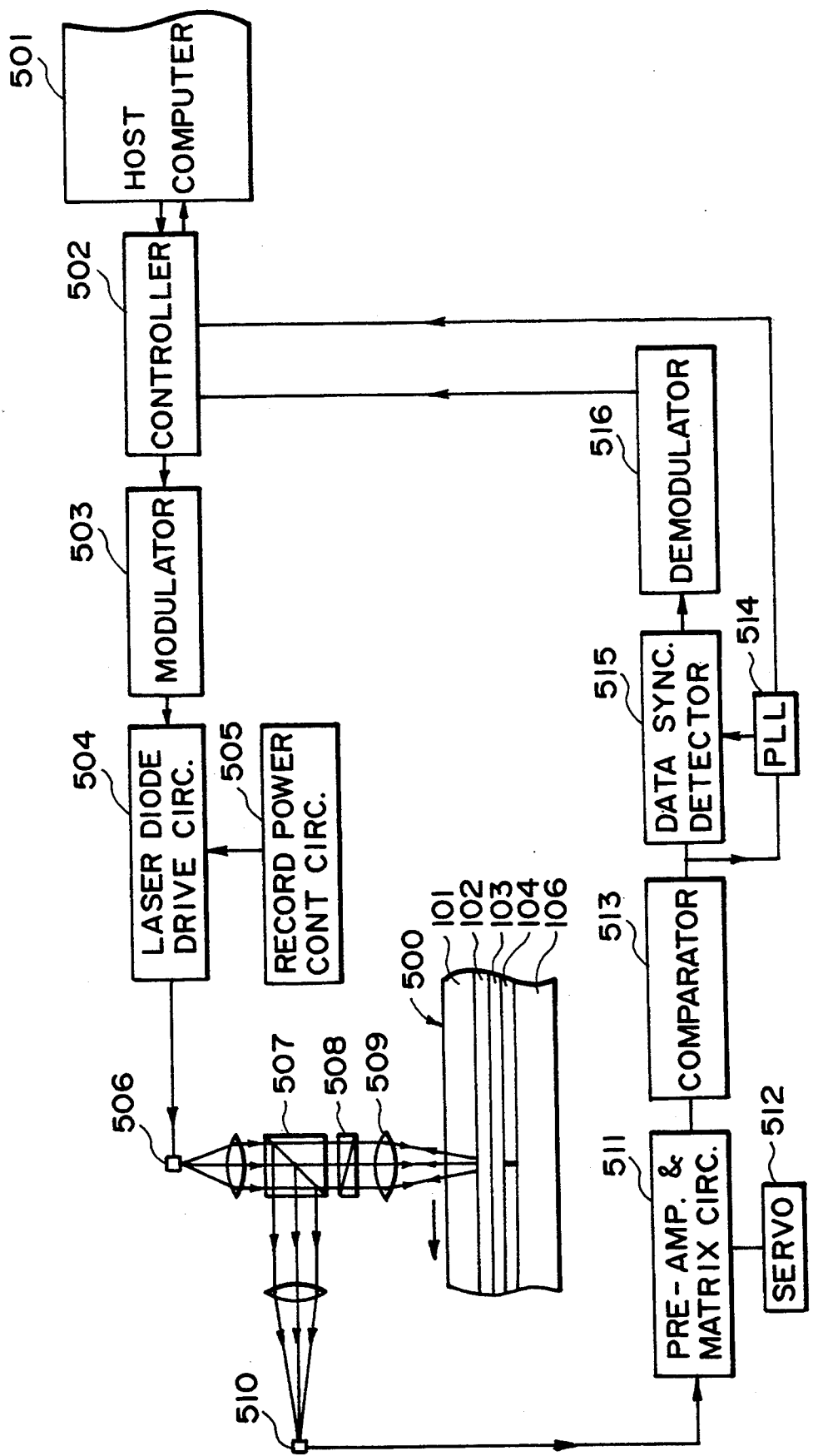
FIG. 5 is a block diagram illustrating an information recording and reproducing apparatus using an optical recording medium according to the present invention.

Next, an outline of information recording and reproduction using an optical recording medium (record blank) according to the present invention will be described with reference to FIG. 5 showing an outline of a recording/reproducing system including the optical recording medium.

Information recording is first explained. Referring to FIG. 5, an information recording and reproducing system as shown includes a record blank 500 (similar to the one shown in FIG. 1) which is moved by a driving means (not shown). Recording data sent from a host computer 501 is subjected to parallel-to-serial data conversion, addition of error correction code, etc. by a controller 502 for controlling the apparatus for recording and reproducing data in and from the medium 500, and then the serial data is converted into code signals by a modulating circuit 503. The coded signal data is sent through a laser diode drive circuit 504 connected to a recording power control circuit 505 to a laser diode 506, which issues a recording light beam having varying intensities changing between a high level and a low level depending on the modulated data. The recording light beam passing a polarizing beam splitter 507 is converted into circular polarized light when it passes through a quarter wave plate 507. The circular polarized light is focused by a condenser lens 509 into a spot beam with a diameter of about 1 μm, which is then incident to the recording medium 500 from the side of the substrate 1 to be focused at the light-absorbing layer 104.

As a result, when the intensity of the recording light beam is at its high level, the light beam-focused part of the light-absorbing layer 104 of the record blank 500 is heated to form a pit (202 in FIG. 2) thereat in the light-absorbing layer 104 and also a thickness change in the transparent intermediate layer 103. On the other hand, when the intensity is at its low level, no change occurs in the light-absorbing layer or transparent intermediate layer. As a result, at the part where the transparent intermediate layer 103 is provided with a thickness change, a new multi-layer optical element showing a successive change in reflectance of the reproducing light beam is formed, thus resulting in a record pit. The record blank 500 including the light-absorbing layer 104 is moved by the driving means (not shown) successively relative to the recording light beam, whereby an information or data track comprising a series of such record pits is formed. The medium 500 having a plurality of such record pits or such information tracks each including a plurality of record pits provides an information record.

Next, the information reproduction operation is explained.

In the reproduction mode, the output power level of the laser diode 507 is fixed by the control circuit 503 - 505 to a constant level below that required for forming an optically detectable change in the light-absorbing layer 104. The reproducing laser beam at a constant level is passed through the polarizing beam splitter 507, the quarter wave plate 508 and the condenser lens 509 to be focused onto an information track to be reproduced of the information record 500. Then, the light reflected from the information record surface is again passed through the quarter wave plate 508 after which the reflected light is caused to have a polarized light plane which is different by 90 degrees from the incident light and is reflected by the beam splitter 507 to reach an optical detector 510. The intensity of the light entering the detector 510 is changed when the focused beam passes over the record pit 202 in the light-absorbing layer 104.

The output from the optical detector 510 is amplified and transformed into a reproduced signal, a focus servo signal and a tracking servo signal by a pre-amplifier and matrix circuit 511. The focus servo signal and tracking servo signal are sent to a servo control system 512. The reproduced signal outputted from the matrix circuit 511 is converted into a digital signal by a comparator 513 and sent to a phase locked loop (PLL) circuit 514 at which a clock signal is extracted.

Figure 11:
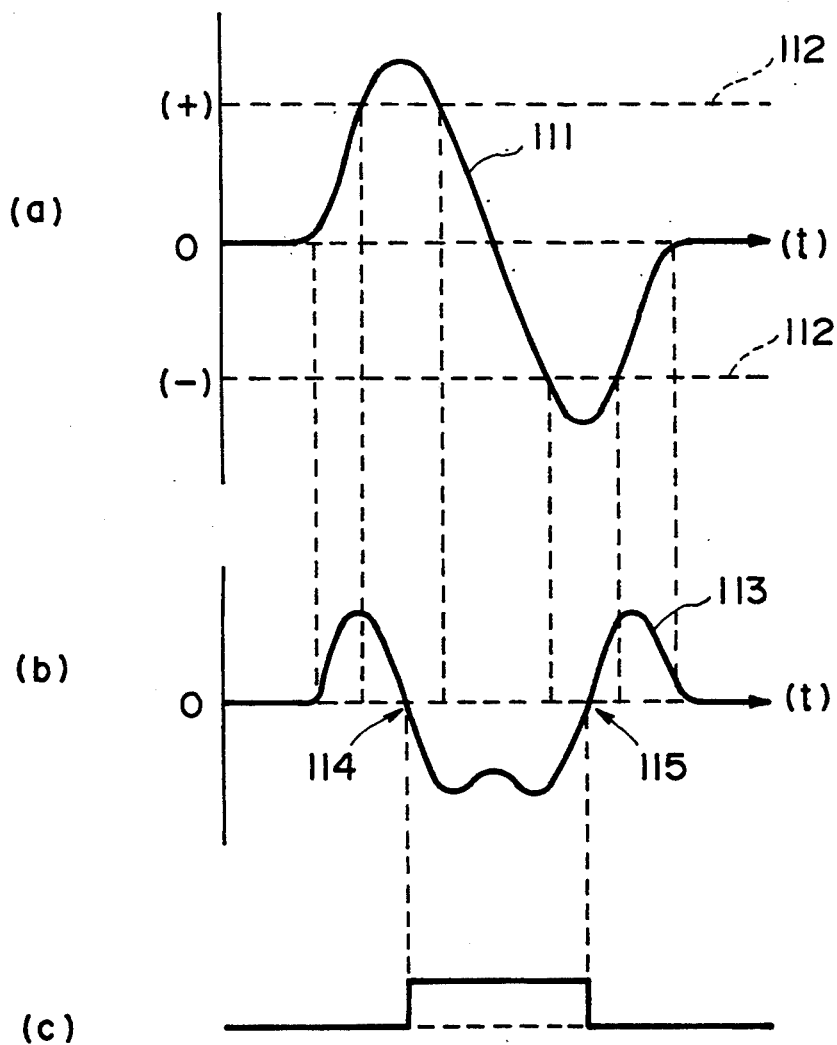
FIG. 11(a) is a waveform diagram showing a reproduced signal at a pit of an information record.
FIG. 11(b) shows a differential waveform corresponding to the reproduced signal shown in FIG. 11(a)
FIG. 11(c) shows a digital signal obtained by treating the reproduced signal shown in FIG. 11(a) by a comparator illustrated in FIG. 10.

In a preferred embodiment of the information reproducing method according to the present invention, the comparator 513 is constituted as shown in more detail in FIG. 10 and used to effect signal processing as will be illustrated with reference to FIG. 11 to convert an analog signal based on a reflectance change from the optical recording medium into a digital signal. More specifically, an analog signal 111 (FIG. 11) is separated into two signals, one of which is introduced into a window comparator 513-1. In the window comparator 513-1, the reflectance at a non-recorded part of the optical recording medium is taken as the base level and, on both + and − sides of the base level, slice levels 112 are respectively set, whereby points of time at which the inputted analog signal exceeds the respective slice levels are memorized (FIG. 11(a)).

The other separated analog signal 111 is introduced into a differentiator 513-2 to be differentiated thereby to obtain a differential signal 113. Then, the differential signal 113 is introduced to a zero-comparator 513-3 where zero-cross points are detected (FIG. 11(b)).

Then, the data within the window comparator 513-1 and the data within the zero-comparator 513-3 are superposed whereby zero-cross points 114 and 115 of the differential signal 113 present within time periods during which the analog signal 111 exceed the slice levels are detected. Thus, a pair of zero-cross points 114 and 115 causing two types of signal sign inversion (i.e., positive to negative at point 114 and negative to positive at point 115 in this embodiment) of the differential signal is detected as indicating the presence of a record pit, whereby an analog signal including a successive change of first a higher and then a lower reflectance with respect to a reference reflectance at non-recorded parts of the optical recording medium as shown in FIG. 11(a) can be converted into a digital signal as shown in FIG. 11(c). Similarly, an analog signal including a successive change of first a lower and then a higher reflectance may be converted into a pair of zero-cross points (114 and 115) causing reverse two types of signal sign inversion (i.e., negative to positive at point 114 and positive to negative at point (115) of the differential signal, thus providing a digital signal indicating another type of record pit.

The clock signal from the PLL circuit 514 (FIG. 5) is used for synchronizing demodulation of the reproduced signal at a data synchronizing and detection system 515. Then, the signal from the detection system 515 is demodulated by a demodulator circuit 516 according to an algorithm reverse to that for the modulation into data of the original type, which is then sent to the controller 502 to be read by the host computer 501.

The laser diode 506, beam splitter 507, quarter wave plate 508, condenser lens 509 and optical detector 510 in combination form an optical head, which is driven to an objective track for recording and reproduction based on the data from the controller 502, and the movement of the optical head and the medium 500 is controlled by the servo control system 512 based on signals including the focus servo signal and tracking servo signal sent from the matrix circuit 511.

It is possible to use different wavelengths for the recording light and the reproducing light beam.

As described above, according to the present invention, it is possible to form a signal including a successive change of positive and negative reflectances at a pit with respect to a reference reflectance at non-recorded parts of an optical recording medium and use such a successive reflectance change for detection of the pit, whereby accurate information reproduction is ensured even when dust or scar is attached to the optical recording medium. The optical recording medium according to the present invention can afford effective utilization of light, particularly semiconductor laser light, for recording by independently disposing a light-reflecting layer and a light-absorbing layer respectively comprising an organic coloring matter.

Incidentally, the "successive change" in transmittance used herein is not limited to a positive-to-negative or negative-to-positive transmittance change with respect to a reference reflectance is caused in succession or continuously with time but also covers a transmittance change including a positive transmittance and a negative occurring with a time spacing therebetween as far as the transmittance change is caused by scanning a single pit with a reproducing beam.

Hereinbelow, the present invention will be described based on Examples.

EXAMPLE 1

Figure 6:
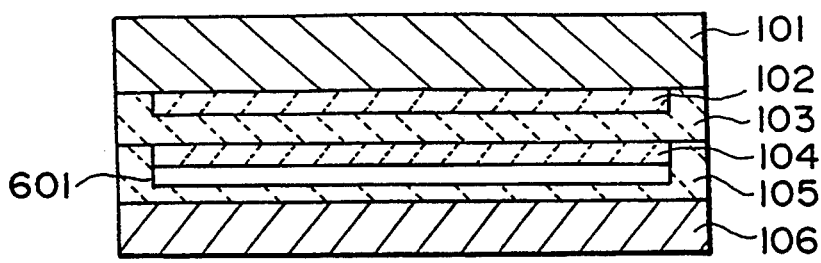
FIG. 6 is a schematic sectional view of an optical card according to Example 1 of the invention.

An optical card having a cross section as shown in FIG. 6 was prepared in the following manner.

First, an optical card substrate 101 was prepared by coating a 0.4 mm-thick acrylic resin plate of 86 mm in longer side and 54 mm in shorter side with a layer of a photopolymer resin (trade name: "30X717", available from Three Bond K. K.) to which was transferred a pattern of stripe-shaped guide grooves of 3 μm in width, 12 μm in pitch and 2500 Å in depth by the 2P-process. The substrate 101 was gravure-coated with an about 1000 Å-thick light-reflecting layer 102 of a compound of the following structural formula [I].

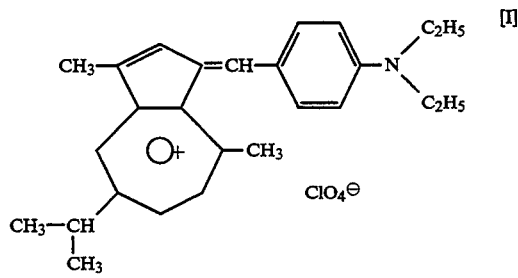

The light-reflecting layer of the compound of the above-formula [I] showed a complex refractive index $N^{ref}$ as follows:

$N^{ref}$=2.0−0.005i (830 nm).

On the light-reflecting layer 102, a 10 wt. % solution of a silicone resin ("SD4570", mfd. by Shin-Etsu Silicone K. K.) in n-hexane was dripped and subjected to spin.-coating at 3000 rpm for 60 sec. to form an about 5800 Å-thick transparent intermediate layer 103 ($n^{int}=1.5$, $\lambda=830$ nm).

Separately, a 50 μm-thick PET (polyethylene terephthalate film substrate 601 of 72 mm×35 mm was coated with a 5.5 wt. % solution in diacetone alcohol of a compound of the following structural formula [II] to form an about 900 Å-thick light-absorbing layer 104.

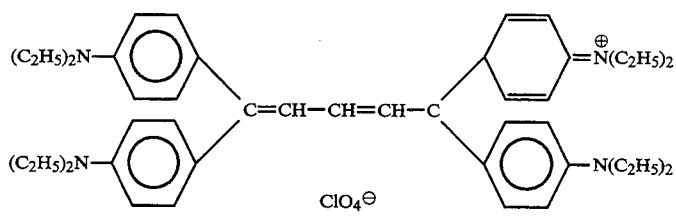

[II]

Then, the optical card substrate and the PET film were laminated with each other so that the transparent intermediate layer 103 and the light-absorbing layer 104 contacted each other, followed by lamination on the PET film of a 50 μm-thick hot melt-type adhesive sheet 105 ("7580", mfd. by Hirodine K. K.) and a 0.25 mm-thick polycarbonate protective substrate 106 and heat lamination of the entire laminate by passing through hot rollers to obtain an optical card having a structure as shown in FIG. 6.

Incidentally, the light-absorbing layer comprising the compound of the above formula [II] showed a complex refractive index $N^{abs}$ as follows:

$N^{abs} = 2.1 - 1.0i$ (830 nm).

When optical cards generally having the structure described above but having varying thicknesses of transparent intermediate layer are irradiated with a light beam having a wavelength of 8300 Å, there is observed a relationship between the reflectance observed at the incidence surface of the optical card and the thickness of the transparent intermediate layer as shown in FIG. 9. As shown in FIG. 9, the optical card having the structure adopted in this Example shows a minimum reflectance of 0% at a transparent intermediate layer thickness of 5200 Å and a maximum reflectance of 46% at 6500 Å. The transparent intermediate layer thickness of this Example was set to provide substantially a half value of 23% between the maximum and maximum-transmittances.

Then, the optical card was set in an optical card recording/reproducing apparatus and subjected to information recording and reproduction by using recording and reproducing beams respectively incident through the transparent substrate under the following conditions:

Recording/reproducing beam diameter: 3.0 μm, Recording/reproducing wavelength: 830 nm, Recording power: 3.5 mW, Recording speed: 400 mm/sec, Recording pulse width: 8 μsec.

The record pits of the optical card thus formed after the recording were observed through a microscope, whereby deformation of the light-absorbing layer was observed but no deformation or decoloration of the light-reflecting layer was observed.

Figure 7:
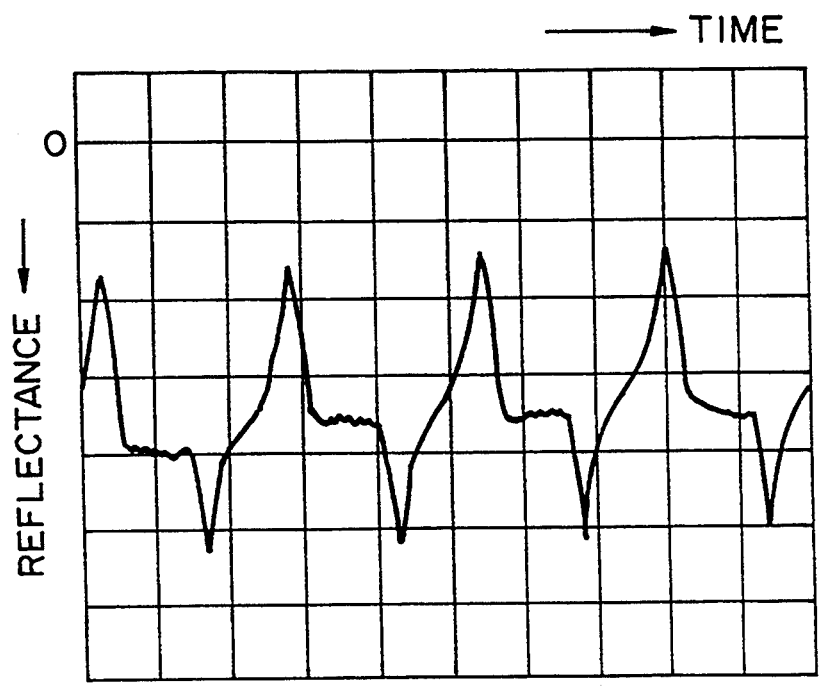
FIG. 7 is a reproduced signal waveform diagram of the optical card of Example 1.

Further, as a result of the information reproduction at a reproduction speed of 400 nm/sec and a reproduction power of 0.3 mW, a change in reflectance of the reproducing beam as shown in FIG. 7 was observed at the record pits.

As is shown in FIG. 7, each record pit of the optical card formed in this Example provided a successive changes in reflectance including an increase and then a decrease, respectively compared with the reference reflectance level at non-record parts. Further, when such a successive reflectance change was detected as a pit, the reproduction method showed a bit error rate of $1.0 \times 10^{-6}$ as measured by dividing the number of miss-matched bits with the total number of recording signal bits.

Comparative Example 1

An optical card was prepared in the same manner as in Example 1 except that the transparent intermediate layer was omitted.

The optical card was subjected to information recording/reproduction in the same manner as in Example 1, whereby the record pit merely provided a decrease in reflectance of the reproducing beam compared with the reference reflectance at non-record parts.

When the optical card was subjected to measurement of bit error rate by a conventional reproduction method wherein a decrease in reflectance was detected as a record pit, the card provided a bit error rate of $1.2 \times 10^{-4}$.

Reference Example 1

An optical card was prepared by forming only the light-reflecting layer on the optical card substrate used in Example 1. By using the optical card, the light-reflecting layer identical to the one used in Example 1 was subjected to measurement of the maximum absorption wavelength, the maximum reflection wavelength, the maximum absorptance, the maximum reflectance and the absorptance of light having a wavelength of 830 nm by using a spectro-photometer ("U-3400", mfd. by Hitachi K. K.). The results are shown in Table 1 below.

Reference Example 2

An optical card was prepared by forming only the light-absorbing layer on the optical card substrate used in Example 1. By using the optical card, the light-absorbing layer identical to the one used in Example 1 was subjected to measurement of the maximum absorption wavelength, the maximum reflection wavelength, the maximum absorptance, the maximum reflectance and the absorptance of light having a wavelength of 830 nm similarly as in Reference Example 1. The results are shown in Table 1 below.

TABLE 1

|  | Reference Example 1 (light-reflecting layer alone) | Reference Example 2 (light-absorbing layer alone) |
| --- | --- | --- |
| Maximum absorption wavelength of the light-reflecting layer | 620 nm | — |

TABLE 1-continued

|  | Reference Example 1 (light-reflecting layer alone) | Reference Example 2 (light-absorbing layer alone) |
| --- | --- | --- |
| Maximum reflection wavelength of the light-reflecting layer | 770 nm | — |
| (maximum reflectance of the light-reflecting layer alone) | (36%) |  |
| Maximum absorption wavelength of the light-absorbing layer | — | 850 nm |
| (maximum absorptance of the light-absorbing layer alone) |  | (62%) |
| Absorptance at 830 nm | 1% | 60% |

EXAMPLE 2

Figure 8:
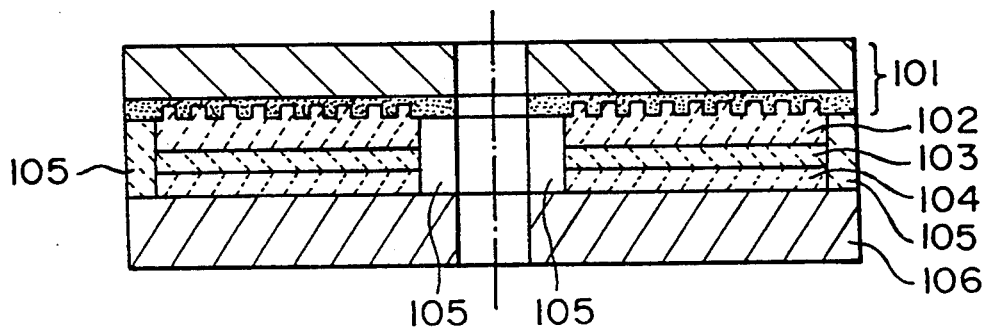
FIG. 8 is a schematic sectional view of an optical disk according to Example 2 of the invention.

An optical disk having a cross section as shown in FIG. 8 was prepared in the following manner.

A polycarbonate-based optical disk substrate 101 having a thickness of 1.2 mm, a diameter of 130 mm and a 15 mm-dia. central hole and provided on its surface with a spiral guide groove of 0.8 μm in width and 900 Å in depth formed at pitch of 1.6 μm, was surface-coated with a 900 Å-thick light-reflecting layer 102 in an annular shape having an inner radius of 20 mm and an outer radius of 63 mm formed by spin-coating of a dichloroethane solution of an organic coloring matter represented by the following structural formula [III]:

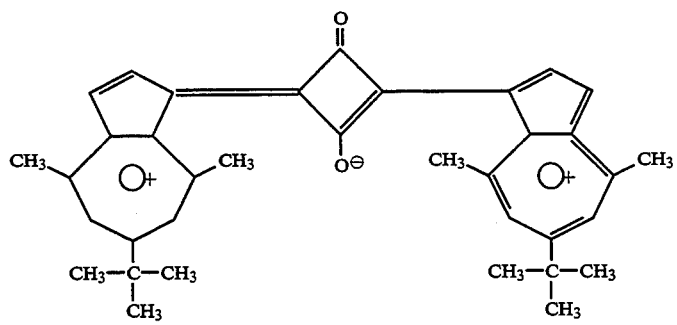

[III]

More specifically, the solution was prepared by dissolving the compound of the formula [III] in diacetone alcohol at a concentration of 5.5 wt. % and dripped and spread over the disk substrate rotating at 3000 rpm for 60 sec.

Then, on the light-reflecting layer, a 3 wt. % aqueous solution of polyvinyl alcohol (trade name: "Poval PVA 205", available from Kuraray K. K.) was dripped and spread for 90 sec. while rotating the disk substrate at 2000 rpm, followed by drying to form an about 4500 Å-thick transparent intermediate layer of polyvinyl alcohol (λ=830 nm, n=1.5).

On the other hand, a protective substrate of the same size and material as the above-mentioned disk substrate was coated with a 1000 Å-thick light-absorbing layer also in an annular shape having an inner radius of 20 mm and an outer radius of 63 mm formed by spin-coating of a diacetone alcohol solution of an organic coloring matter of the above-mentioned structural formula [II].

The solution was prepared by dissolving the compound of the formula [II] in diacetone alcohol at a concentration of 5.5 wt. % and dripped and spread for 90 sec. over the protective substrate while rotating the protective substrate at 3000 rpm.

Then, as shown in FIG. 8, an ultraviolet-curable adhesive 105 (trade name: "KRX-650-4", available from Asahi Denka K. K.) was applied at inner and outer peripheral parts of the disk substrate 101 and the protective substrate 106, and these substrates were applied to each other so that the transparent intermediate layer 103 and the light-absorbing layer 104 contacted each other, whereby an optical disk (record blank) having a cross-section as shown in FIG. 8 was prepared.

Incidentally, the light-reflecting layer comprising the compound of the above formula [III] showed a complex refractive index $N^{ref}$ as follows:

$$N^{ref}=2.4-0.1i.$$

Figure 12:
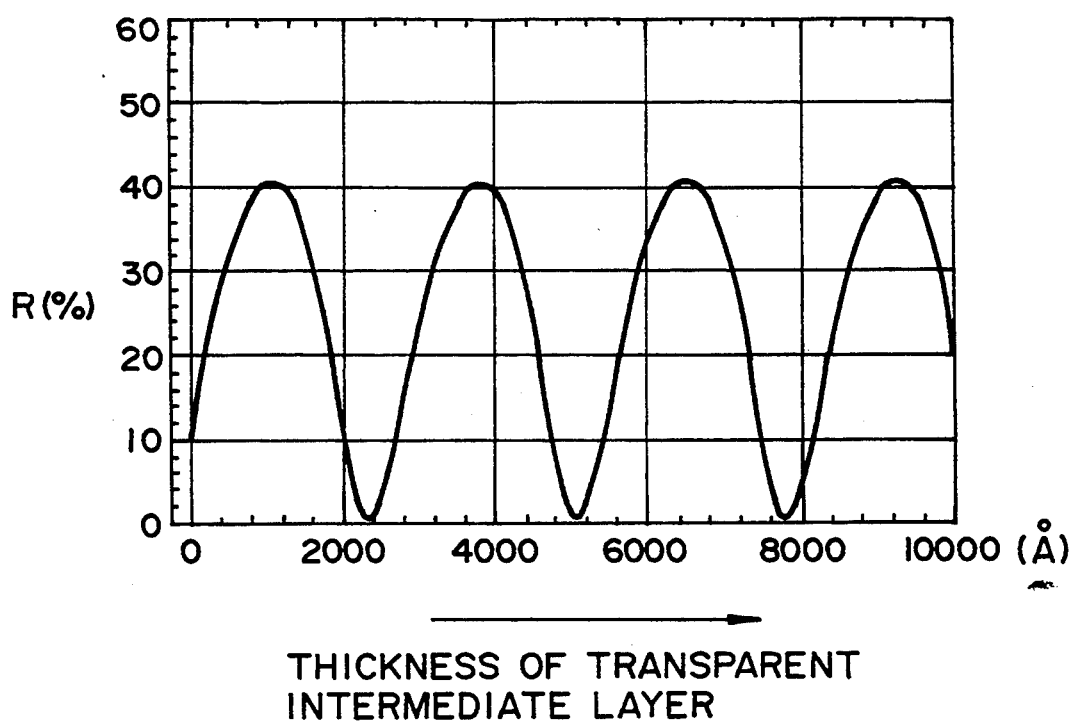
FIG. 12 is a graph showing a relationship between the reflectance R (%) and the thickness of transparent intermediate layer of the optical disk of Example 2.

When optical disks generally having the structure described above but having varying thicknesses of transparent intermediate layer are irradiated with a light beam having a wavelength of 8300 Å, there is observed a relationship between the reflectance observed at the incidence surface of the optical card and the thickness of the transparent intermediate layer as shown in FIG. 12. As shown in FIG. 12, the optical card having the structure adopted in this Example shows a maximum reflectance of 40% at a transparent intermediate layer thickness of 3500 Å and a minimum reflectance of 0% at 5000 Å. The transparent intermediate layer thickness of this Example was set to provide substantially a half value of 20% between the maximum and maximum-transmittances.

Then, the optical disk was set in an optical disk evaluating apparatus (trade name: "OMS-1000", available from Nakamichi K. K.) and subjected to information recording by irradiating the optical disk rotated at a linear speed of 5.6 m/sec with a recording light beam incident through the transparent substrate and having a wavelength of 830 nm, a beam spot diameter of 1.6 μm and power of 6.0 mW at a recording pulse width of 350 nsec.

After the recording, the protective substrate and the transparent substrate of the optical disk were respectively peeled off and observed through an optical microscope, whereby deformation of the light-absorbing layer was observed, but no deformation or decoloration of the light-reflecting layer was observed.

Further, an optical disk prepared and subjected to recording in quite the same manner as above was subjected to information reproduction in the above-mentioned optical disk evaluating apparatus by using a reproducing beam incident through the transparent substrate and having a wavelength of 830 nm, a beam spot diameter of 1.0 μm and a power of 0.2 mW, whereby each record pit showed a successive change in transmittance including first a decrease and then an increase, respectively compared with the reference reflectance at non-record parts, i.e., reverse to that shown in FIG. 7. Further, when the above-mentioned disk evaluating apparatus was re-modeled so as to detect such a successive change in transmittance as a record pit and used for information reproduction, the optical disk after the recording in the above-described manner showed a bit error rate of $1.1 \times 10^{-6}$.

Comparative Example 2

An optical disk was prepared in the same manner as in Example 2 except that the transparent intermediate layer was omitted.

The optical disk was subjected to information recording/reproduction in the same manner as in Example 2, whereby the record pit merely provided a decrease in reflectance of the reproducing beam compared with the reference reflectance at non-record parts.

When the optical disk was subjected to measurement of bit error rate by a conventional reproduction method wherein a decrease in reflectance was detected as a record pit, the disk provided a bit error rate of $1.0 \times 10^{-4}$.

Reference Example 3

An optical disk was prepared by forming only the light-reflecting layer on the optical disk substrate used in Example 2. By using the optical disk, the light-reflecting layer identical to the one used in Example 2 was subjected to measurement of the maximum absorption wavelength, the maximum reflection wavelength, the maximum absorptance, the maximum reflectance and the absorptance of light having a wavelength of 830 nm by using a spectro-photometer ("U-3400", mfd. by Hitachi K. K.). The results are shown in Table 2 below.

Reference Example 4

An optical disk was prepared by forming only the light-absorbing layer on the optical disk substrate used in Example 2. By using the optical disk, the light-absorbing layer identical to the one used in Example 2 was subjected to measurement of the maximum absorption wavelength, the maximum reflection wavelength, the maximum absorptance, the maximum reflectance and the absorptance of light having a wavelength of 830 nm similarly as in Reference Example 1. The results are shown in Table 2 below.

TABLE 2

|  | Reference Example 3 (light-reflecting layer alone) | Reference Example 4 (light-absorbing layer alone) |
| --- | --- | --- |
| Maximum absorption wavelength of the light-reflecting layer | 760 nm | — |
| Maximum reflection wavelength of the light-reflecting layer | 835 nm | — |
| (maximum reflectance of the light-reflecting layer alone) | (43%) |  |
| Maximum absorption wavelength of the light-absorbing layer | — | 850 nm |
| (maximum absorptance of the light-absorbing layer alone) |  | (62%) |
| Absorptance at 830 nm | 3% | 60% |

What is claimed is:

1. An optical recording medium useable with a recording beam and a reproducing beam, said optical recording medium comprising:

a transparent substrate;

a light-reflecting layer disposed on said transparent substrate, said light-reflecting layer comprising an organic coloring matter;

a transparent intermediate layer disposed on said light-reflecting layer; and a light-absorbing layer comprising an organic coloring matter and disposed on said transparent intermediate layer, said light-absorbing layer being deformable in response to a recording beam incident thereto through said transparent substrate, thereby causing a local change in thickness of said transparent intermediate layer, wherein said optical recording medium provides a reflectance of a reproducing beam having a prescribed wavelength incident to said light-absorbing layer through said transparent substrate, the reflectance of the reproducing beam having a minimum value and a maximum value at different thicknesses of said transparent intermediate layer, and wherein said transparent intermediate layer is formed in a thickness that provides a reflectance between the minimum value and the maximum value in response to the reproducing beam.

2. An optical recording medium according to claim 1, wherein said light-reflecting layer has a thickness $d^{ref}$ satisfying a relationship of the formula (1) below:

$$(\lambda r/6n^{ref})(2l+1) < d^{ref} < (\lambda r/3n^{ref})(2l+1) \qquad (1),$$

wherein $\lambda r$ denotes the wavelength of the reproducing beam, $n^{ref}$ denotes the real part of the complex refractive index of said light-reflecting layer, and $l$ is 0 or a positive integer.

3. An optical recording medium according to claim 2, wherein the thickness $d^{ref}$ satisfies a relationship of the formula (2) below:

$$d^{ref} = (\lambda/4n^{ref})(2l+1) \pm \lambda r/32n^{ref} \qquad (2).$$

4. An optical recording medium according to claim 1, wherein said light-reflecting layer has a maximum reflection wavelength $\lambda(R^{ref}\text{max})$ which is substantially equal to the wavelength $\lambda r$ of the reproducing beam.

5. An optical recording medium according to claim 4, wherein said light-reflecting layer has a maximum absorption wavelength $\lambda^{ref}\text{max}$ satisfying a relationship of the formula (4) below with the wavelength $\lambda r$ of the reproducing beam:

$$\lambda r - \lambda^{ref}\text{max} > 100 \text{ nm} \qquad (4)$$

6. An optical recording medium according to claim 5, wherein $\lambda^{abs}\text{max}$ and $\lambda w$ satisfy a relationship of the formula (6) below:

$$\{\lambda^{abs}\text{max} - \lambda w\} < 50 \text{ nm} \qquad (6).$$

7. An optical recording medium according to claim 1, wherein said light-absorbing layer has a maximum absorption wavelength $\lambda^{abs}\text{max}$ which is substantially equal to the wavelength $\lambda w$ of the recording beam, and said light-reflecting layer has a maximum absorption wavelength $\lambda^{ref}\text{max}$ satisfying a relationship of the formula (3) below:

$$\lambda^{ref}\text{max} < \lambda w \qquad (3).$$

8. An optical recording medium according to claim 1, wherein said light-reflecting layer has an absorptance of at most 20% and said transparent intermediate layer has an absorptance of at most 5%, respectively, of the reproducing beam.

9. An optical recording medium according to claim 1, wherein said light-reflecting layer has an absorptance of at most 20%, said transparent intermediate layer has an absorptance of at most 5%, and said light-absorbing layer has an absorptance of at least 50%, respectively, of the recording beam.

10. An optical recording medium useable with a recording beam and a reproducing beam, said optical recording medium comprising:
   a transparent substrate;
   a light-reflecting layer disposed on said transparent substrate, said light-reflecting layer comprising an organic coloring matter;
   a transparent intermediate layer disposed on said light-reflecting layer; and
   a light-absorbing layer comprising an organic coloring matter and disposed on said transparent intermediate layer, said light-absorbing layer being provided with a record pit accompanied with a geometrical deformation for the recording of information and being provided with non-deformed, non-recorded parts,
   whereby said optical recording medium provides a successive change in reflectance, relative to a reference reflectance corresponding to non-recorded parts of said light-absorbing layer, of at least one of first a higher and then a lower reflectance and first a lower and then a higher reflectance of a reproducing beam that is incident to said light-absorbing layer through said transparent substrate so as to scan the record pit.

11. An optical recording medium according to claims 10, wherein said light-reflecting layer has a thickness $d^{ref}$ satisfying a relationship of the formula (1) below:

$$(\lambda r/6n^{ref})(2l+1) < d^{ref} < (\lambda r/3n^{ref})(2l+1) \quad (1),$$

wherein $\lambda r$ denotes the wavelength of the reproducing beam, $n^{ref}$ denotes the real part of the complex refractive index of said light-reflecting layer, and $l$ is 0 or a positive integer.

12. An optical recording medium according to claim 11, wherein the thickness $d^{ref}$ satisfies a relationship of the formula (2) below:

$$d^{ref} = (\lambda r/4n^{ref})(2l+1) \pm \lambda r/32n^{ref} \quad (2).$$

13. An optical recording medium according to claim 10, wherein said light-reflecting layer has a maximum reflection wavelength $\lambda(R^{ref}\text{max})$ which is substantially equal to the wavelength $\lambda r$ of the reproducing beam.

14. An optical recording medium according to claim 13, wherein said light-reflecting layer has a maximum absorption wavelength $\lambda^{ref}\text{max}$ satisfying a relationship of the formula (4) below with the wavelength $\lambda r$ of the reproducing beam:

$$\lambda r - \lambda^{ref}\text{max} > 100 \text{ nm} \quad (4).$$

15. An optical recording medium according to claim 14, wherein $\lambda^{abs}\text{max}$ and $\lambda w$ satisfy a relationship of the formula (6) below:

$$|\lambda^{abs}\text{max} - \lambda w| < 50 \text{ nm} \quad (6).$$

16. An optical recording medium according to claim 10, wherein said light-absorbing layer has a maximum absorption wavelength $\lambda^{abs}\text{max}$ which is substantially equal to the wavelength $\lambda w$ of the recording beam, and said light-reflecting layer has a maximum absorption wavelength $\lambda^{ref}\text{max}$ satisfying a relationship of the formula (3) below:

$$\lambda^{ref}\text{max} < \lambda w \quad (3).$$

17. An optical recording medium according to claim 10, wherein said light-reflecting layer has an absorptance of at most 20% and said transparent intermediate layer has an absorptance of at most 5% respectively, of the reproducing beam.

18. An optical recording medium according to claim 10, wherein said light-reflecting layer has an absorptance of at most 20%, said transparent intermediate layer has an absorptance of at most 5%, and said light-absorbing layer has an absorptance of at least 50%, respectively, of the recording beam.

19. An optical recording medium according to claim 10, wherein said transparent intermediate layer forms at the record pit a successive change of first a decreased thickness and then an increased thickness, respectively, with respect to a reference thickness at a non-record part thereof in a direction of scanning with the recording beam.

20. An information recording method comprising the steps of:
   providing an optical recording medium, the optical recording medium comprising a transparent substrate; a light-reflecting layer disposed on the transparent substrate and comprising an organic coloring matter; a transparent intermediate layer disposed on the light-reflecting layer; and a light-absorbing layer comprising an organic coloring matter and disposed on the transparent intermediate layer so as to deform in response to a recording beam incident thereto through the transparent substrate, thereby causing a local change in thickness of the transparent intermediate layer; wherein the optical recording medium provides a reflectance of a reproducing beam having a prescribed wavelength incident to the light-absorbing layer through the transparent substrate, the reflectance of the reproducing beam having a minimum value and a maximum value at different thicknesses of the transparent intermediate layer, and wherein the transparent intermediate layer is formed in a prescribed thickness that provides a reflectance between the minimum value and the maximum value in response to the reproducing beam; and
   scanning the optical recording medium in a scanning direction with a recording beam incident to the light-absorbing layer through the transparent substrate to deform the light-absorbing layer, thereby causing a thickness change in the transparent intermediate layer such that the thickness first decreases and then increases relative to the prescribed thickness in the scanning direction.

21. An information reproducing method for reproducing information from an optical recording medium comprising a transparent substrate; a light-reflecting layer disposed on the transparent substrate and comprising an organic coloring matter; a transparent intermediate layer disposed on the light-reflecting layer; and a light-absorbing layer disposed on the transparent intermediate layer and comprising an organic coloring matter, the light-absorbing layer being provided with a record pit accompanied by a geometrical deformation for the recording of information and being provided with non-deformed, non-recorded parts; said information reproducing method comprising the steps of:

scanning the optical recording medium, along a track that includes the record pit, with a reproducing beam that has a prescribed wavelength and is incident to the absorbing layer through the transparent substrate; and detecting, from a reflection of the incident reproducing beam, a successive change in reflectance of at least one of first a higher and then a lower reflectance and first a lower and then a higher reflectance of the reproducing beam relative to a reference reflectance of the reproducing beam corresponding to non-recorded parts of the optical recording medium.

22. An information reproducing method according to claim 21, wherein the record pit in the light-absorbing layer is further accompanied by a change in a thickness of the transparent intermediate layer such that the thickness of the transparent intermediate layer first decreases and then increases in the scanning direction relative to a thickness thereof at non-recorded parts.

* * * * *

UNITED STATES PATENT AND TRADEMARK OFFICE
CERTIFICATE OF CORRECTION

PATENT NO. : 5,428,599          Page 1 of 4
DATED      : June 27, 1995
INVENTOR(S): MASATAKA YASHIMA, ET AL.

It is certified that error appears in the above-indentified patent and that said Letters Patent is hereby corrected as shown below:

[57] Abstract

Line 8, "charge" should read --change--; and
    Line 13, "constitutes" should read --constitute--.

Column 1

Line 13, "called" should read --received--;
    Line 20, "One" should read --one--;
    Line 22, "One" should read --one--; and
    Line 41, "on a" should read --on or--.

Column 2

Line 33, "opticell" should read --optical--;
    Line 39, "with." should read --with--; and
    Line 41, "indicated" should read --incident--.

Column 3

Line 31, ",at" should read --at--.

Column 7

Line 13, "$(\lambda n/4n^{ref})$" should read --$(\lambda r/4n^{ref})$--; and
    Line 15, "other," should read --other hand,--.

Column 8

Line 56, "slat-type," should read --salt-type,--;
    Line 61, "the maximum" should read --and the maximum--;
    Line 63, "by" should read --of--;

UNITED STATES PATENT AND TRADEMARK OFFICE
CERTIFICATE OF CORRECTION

PATENT NO. : 5,428,599 Page 2 of 4
DATED : June 27, 1995
INVENTOR(S) : MASATAKA YASHIMA, ET AL.

It is certified that error appears in the above-indentified patent and that said Letters Patent is hereby corrected as shown below:

Column 8

Line 65, "λw" should read --λw,--; and
Line 67, "by" should read --of--.

Column 9

Line 6, "{λ$^{abs}$max-λw{<50nm" should read
  --|λ$^{abs}$max-λw|<50nm--;
Line 11, "maximum" should read --maximum--;
Line 12, "maxinum" should read --single--;
Line 35, "by" should read --of--;
Line 40, "media" should read --mediate--; and
Line 64, "In case" should read --In a case--.

Column 11

Line 45, "tion,," should read --tion,--.

Column 13

Line 56, "signal," should read --signal),--.

Column 14

Line 27, "is" should be deleted;

Formula [I], "  " should read -- 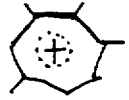 --; and

Line 65, "N$^{ref}$=2.0-0.005i(830nm)." should read
  --N$^{ref}$=2.3-0.005i(830nm).--.

UNITED STATES PATENT AND TRADEMARK OFFICE
CERTIFICATE OF CORRECTION

PATENT NO. : 5,428,599

DATED : June 27, 1995

INVENTOR(S) : MASATAKA YASHIMA, ET AL.

It is certified that error appears in the above-indentified patent and that said Letters Patent is hereby corrected as shown below:

Column 15

Line 2, "spin.-coating" should read --spin-coating--;
Line 41, "incidence" should read --incident--; and
Line 49, "maximum-" should read --maximum--.

Column 16

Line 4, "a" should be deleted.

Column 17

Formula [III], "  " should read --  --; and

"  " should read --  --.

Column 18

Line 4, ",each" should read --each--; and
Line 19, "incidence" should read --incident--.

Column 19

Line 66, "and-a" should read --and a--.

Column 20

Line 37, "$(\lambda/4n^{ref})$" should read --$(\lambda r/4n^{ref})$--;
Line 49, "100nm(4)" should read
--100nm                    (4).--;

UNITED STATES PATENT AND TRADEMARK OFFICE
CERTIFICATE OF CORRECTION

PATENT NO. : 5,428,599

DATED : June 27, 1995

INVENTOR(S) : MASATAKA YASHIMA, ET AL.

It is certified that error appears in the above-indentified patent and that said Letters Patent is hereby corrected as shown below:

Column 20

Line 52, "$80^{abs}max$" should read --$\lambda^{abs}max$--; and
Line 55, "$\{\lambda^{abs}max-\lambda w\{<50nm$" should read --$|\lambda^{abs}max-\lambda w|<50nm$--.

Column 21

Line 35, "claims" should read --claim--.

Column 23

Line 5, "parts;" should read --parts,--.

Signed and Sealed this

Twenty-fourth Day of October, 1995

Attest:

BRUCE LEHMAN

Attesting Officer — Commissioner of Patents and Trademarks